United States Patent [19]

Peli

[11] Patent Number: 5,511,141
[45] Date of Patent: Apr. 23, 1996

[54] FIBER OPTIC READING MAGNIFIERS

[76] Inventor: Eliezer Peli, 32 Kendall Rd., Newton, Mass. 02159

[21] Appl. No.: 228,209

[22] Filed: Apr. 15, 1994

[51] Int. Cl.⁶ .................................................... G02B 6/06
[52] U.S. Cl. ........................... 385/116; 385/120; 385/901
[58] Field of Search ................................ 385/116, 115, 385/117, 120, 121, 901

[56] References Cited

U.S. PATENT DOCUMENTS

| | | | |
|---|---|---|---|
| 3,043,910 | 7/1962 | Hicks, Jr. | 178/7.85 |
| 3,187,627 | 6/1965 | Kapany | 88/39 |
| 3,402,000 | 9/1968 | Crawford | 350/96 |
| 3,622,785 | 11/1971 | Irwin et al. | 250/77 |
| 3,853,658 | 12/1974 | Ney | 156/180 |
| 3,874,783 | 4/1975 | Cole | 350/96 |
| 3,909,109 | 9/1975 | Aurenz | 350/96 |
| 4,076,978 | 2/1978 | Brennan et al. | 250/213 |
| 4,099,833 | 7/1978 | Tosswill | 385/120 |
| 4,116,739 | 9/1978 | Glenn | 156/169 |
| 4,202,599 | 5/1980 | Tosswill | 350/96 |
| 4,330,169 | 5/1982 | Kantor | 350/96 |
| 4,772,093 | 9/1988 | Abele et al. | 350/96.25 |
| 4,802,756 | 2/1989 | Feinbloom | 351/200 |
| 4,859,032 | 8/1989 | Feinbloom | 350/235 |
| 4,923,282 | 5/1990 | Spitzberg | 350/245 |
| 5,028,127 | 7/1991 | Spitzberg | 351/158 |
| 5,087,112 | 2/1992 | Feinbloom | 359/800 |
| 5,168,405 | 12/1992 | Feinbloom | 359/802 |
| 5,246,717 | 9/1993 | Garwin | 426/2 |
| 5,293,437 | 3/1994 | Nixon | 385/115 |

OTHER PUBLICATIONS

"Stand Magnifiers: An Evaluation of New Optical Aids from COIL", Bullimore and Bailey, Optometry & Vision Science, 66; 766–773, Jan. 1989.

"Psycophysics of Reading III. A Fiberscope Low–Vision Reading Aid", Denis G. Pelli et al., Investigative Opthalmology & Visual Science, vol. 26/5, May, 1985.

"A New Ergonomically Designed Prism Stand Magnifier", Larry Spitzberg et al., Journal of Vision Rehabilitation, vol. 3, No. 4, pp. 47–51, Jan. 1989.

*Primary Examiner*—Rodney B. Bovernick
*Assistant Examiner*—Robert E. Wise
*Attorney, Agent, or Firm*—Bromberg & Sunstein

[57] ABSTRACT

A reading magnifier formed by a bundle of juxtaposed longitudinally tapered optical fibers having a viewing end and a flat base end. The flat base end is cut at a bias across the bundle of optical fibers such that a line normal to the flat base end forms an acute angle with the direction of orientation of the optical fibers. The viewing end of the bundle may also be cut at an angle relative to the optical fibers. The reading magnifier provides a cone of light admittance that is skewed at an angle relative to a cylinder normal to the flat base end. The tilted admittance cone may also be achieved by bending the bottom portion of a bundle of tapered continuous optical fibers.

7 Claims, 9 Drawing Sheets

FIBER OPTIC READING MAGNIFIERS

BACKGROUND OF THE INVENTION

This invention is related to a magnifying apparatus, and more particularly, to an apparatus and method used to view an object such as a book or other printed material on a surface by magnifying the image of the object and viewing the magnified image at a convenient angle to the surface on which the object is located. Specifically, this invention is related to the use of fiber optic tapers as magnifiers. Stand magnifiers are frequently used as a visual aid by the visually impaired. Their main advantage over other reading aids is their relative stability and ease of use. The fixed and stable distance from the reading material, and the flexibility in distance from the eye to the magnifier make their use easy to learn.

Most existing stand magnifiers, however, require the user to bend over the magnifier in order to be able to read through them. When used at a desk, for example, the user has to lean forward and closely follow, with his/her whole upper-body, the position of the magnifier on the page.

The postural problem with the stand magnifier also complicates the attainment of proper illumination for the printed material. The user's head tends to block light from above, and thus the need to permit light access through the sides of the magnifier which makes for an uncomfortable and difficult hand grip. The difficulties in getting proper illumination have resulted in the development of many electrically powered illuminated stand magnifiers. As one solution to these difficulties, Combined Optical Industries Limited (COIL), 200 Bath Road, Slough, SL14DW, England, has recently introduced a series of tilting stand magnifiers (Coil 5214). However, tilting the lens results in distortions and reduces the field of view. U.S. Pat. No. 4,923,282 (Spitzberg et al.) discloses another attempt to address this issue with a design that incorporates a prism to tilt the image's angle, As with all other lens magnifiers, the stand magnifiers are limited also by distortions and vignetting. In most cases, the limited field prevents binocular use and thus eliminates the potential benefits of binocular vision. Attempts to increase the field by aspheric lens design usually further increase the optical distortions.

The actual magnification provided by lens magnifiers is not easily defined or measured. The information provided by the manufacturer is frequently inaccurate and misleading (Bullimore and Bailey, Stand magnifiers: an evaluation of new optical aids from COIL, Optometry and Vision Science, 66; 766–773, 1989), thus making the use and prescription of these devices unnecessarily complicated.

As an entirely different approach a symmetrical bundle of tapered optical fibers (commonly referred to as a taper) such as that shown in FIG. 1 has been used as a magnifier. The most common application has been for use by stamp collectors. The image light from these magnifiers is directed for the most part perpendicular to the viewing face making the best viewing position directly over the magnifier. While a user may tolerate bending over the magnifier to view a stamp, it would be very awkward for extended use in reading a book, for example. Furthermore, these symmetrical optical fiber tapers provide no control over unwanted specular reflection.

There is, therefore, a need for a magnifier which does not introduce distortion and which can be used by a person sitting in an upright position, and which does not require the person to bend over the apparatus when reading a full page of text.

SUMMARY OF THE INVENTION

The invention is directed to a reading magnifier formed from a bundle of juxtaposed longitudinally tapered optical fibers. The viewing end of the optical fiber bundle is at the larger end. The opposite (smaller) end of the bundle is flat. This flat base end is cut at an angle with respect to the optical fibers such that a line normal to the flat base end forms an acute angle with the direction of orientation of the optical fibers. The viewing end may also be cut at an angle, in particular, such that the viewing end is parallel or almost parallel with the flat base end of the bundle. The viewing end may be further modified to include a convex spherical or cylindrical surface. In order to serve as a reading magnifier, low resolution fibers having a diameter at the viewing end of at least about 80 microns are acceptable for users with normal vision.

An alternate embodiment of the reading magnifier of the invention may be formed in which continuous fibers are curved between the flat base end of the bundle and the large (viewing) end of the fibers. Moreover, a constant diameter portion may extend between the viewing end of the bundle and the tapered portion of the fibers.

The reading magnifier of the present invention may be advantageously manipulated with ease by the user to increase the use of available light sources for illuminating the magnified image and to reduce or eliminate specular reflections. Further advantages of the reading magnifier of the invention are that it provides a large scanning range and that it can be viewed by more than one person thereby facilitating the teaching of reading with magnifiers to the visually impaired. The reading magnifiers of the present invention advantageously have a cone of light admittance that is skewed relative to vertical (when placed on a horizontal surface) so that simple rotation of the magnifier can optimize illumination and/or decrease glare.

DETAILED DESCRIPTION OF THE PREFERRED EMBODIMENTS

This invention relates to a magnifying apparatus, and more particularly, to fiber optic magnifiers. It is well known that a tapered fiber optic bundle containing well-aligned (so called "coherently" aligned) fibers is capable of transmitting an image from one face to the opposite face with either a reduction or magnification in size. Specifically, the size of the transmitted image is in direct proportion to the change of size of the two ends of the fiber optic taper. Size ratios (i.e. magnifications) of from nearly unity to as much as 10:1 may be practically obtained using a fiber optic taper.

Figure 1:
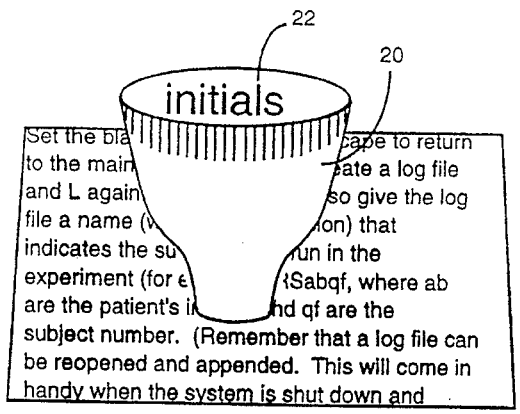
FIG. 1 is a drawing of a prior art tapered fiber optic bundle being used as a reading magnifier.

When the small end of the taper is placed in contact with an object such as a printed page, an enlarged image appears at the upper, larger face of the taper (FIG. 1). Moreover, light entering the upper face from ceiling lamps, the sun or any light source generally located above the taper is captured by the taper and is "condensed" onto the object surface and serves to illuminate the object. In general, no additional illumination is needed under normally illuminated ambient conditions. For maximum light gathering capability, the optical fibers making up the taper should have a high effective numerical aperture.

Numerical aperture (N.A.) is defined as:

$$N.A. = n \sin \alpha$$

where n is the refractive index of the external medium (normally air where n=1.0) and $\alpha$ is the half angle of the largest cone of light capable of entering or leaving the fiber. In a fiber optic taper, the N.A. is a maximum at the smaller end:

$$N.A. = \sqrt{n_1^2 - n_2^2}$$

where $n_1$ is the refractive index of the core of the fiber, and $n_2$ is the refractive index of the cladding of the fiber.

At the larger end, the effective N.A. is reduced by virtue of the tapering of the fibers and the enlarging of the image in a manner similar to the Lagrange condition for lenses. Thus, the effective N.A. of the large end of the taper is:

$$N.A._{EFF} = N.A.(\max.)/M,$$

where M is the taper ratio or magnification.

For the best light gathering capability and large scanning range, this effective N.A. should be relatively large, in the range of 0.2–0.5. If the small end N.A. (max.) is nearly 1.0 then values of M of 2x–5x are practical.

The size of the fibers in the taper is determined by the application as a visual magnifier. In general, the large end of the taper will be viewed by the naked eye at about 10 inches away (or a range of 6"–20", depending on the accommodation capabilities of the observer). At a distance of 10 inches and with normal eye resolution of about ⅓ milliradian, the diameter of the fibers at the large end can be about 0.0033 inches (or about 80 μm) and be just barely resolved by one with normal vision. As a practical matter, the image with the taper will also be visually acceptable with a fiber size of 2–3 times this value (up to 160–240 μm in size).

When used by persons with impaired vision (due to macular degeneration, for example), the fiber size may be even larger and be entirely effective. Fiber sizes up to 500 μm may be entirely adequate depending upon the degree of limited visual capabilities of the observer.

These large fiber sizes which are suitable for magnifiers for visually impaired persons allow the manufacturing process for these tapers to be simplified, thereby reducing their cost of manufacture.

The present invention makes use of these properties of fiber optic tapers as reading magnifiers, but, in addition, improves upon their use by slanting either the bottom face or both faces of the taper so as to tilt the light emitted from the upper face towards the eye of the observer, when seated at a table for example.

Figure 2:
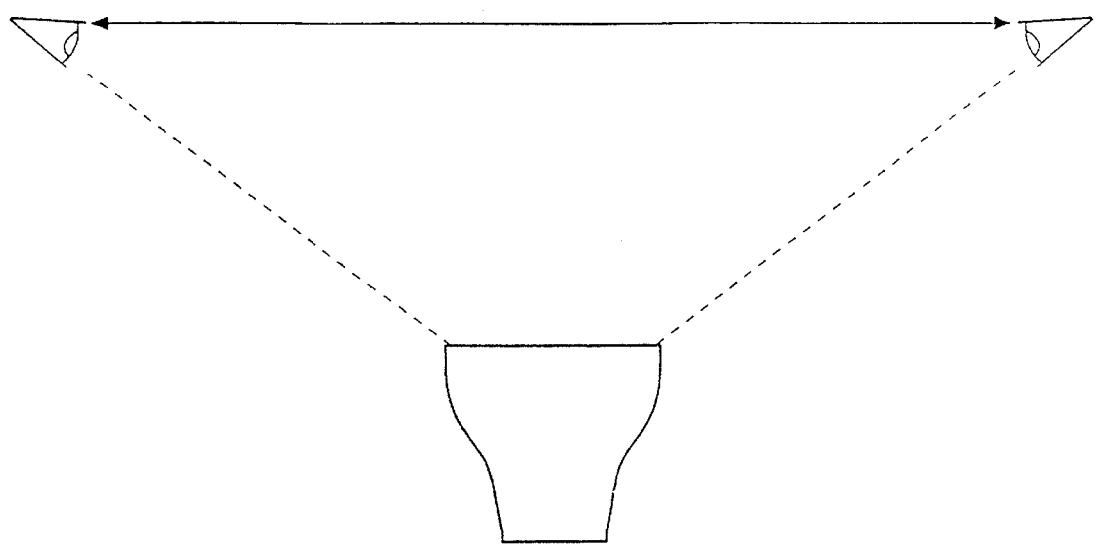
FIG. 2 is an illustration of the prior art magnifier of FIG. 1 illustrating the range of positions of a user's eyes from which the text can be seen with the magnifier.

In a prior art fiber optic magnifier 20, the image seen on the upper face 22 may be viewed at a small angle to that face and still be clearly seen, but due to reduction in N.A. resulting from tapering, this angle is quite limited and thereby limits the scanning area for the magnifier. This scanning area is the range over which an eye can see the image on the upper face 22 as shown in FIG. 2. In the prior art fiber optic magnifier 20, the upper face 22 and the bottom face 24 are perpendicular to the straight coherent orientation direction of the optical fibers.

Figure 3:
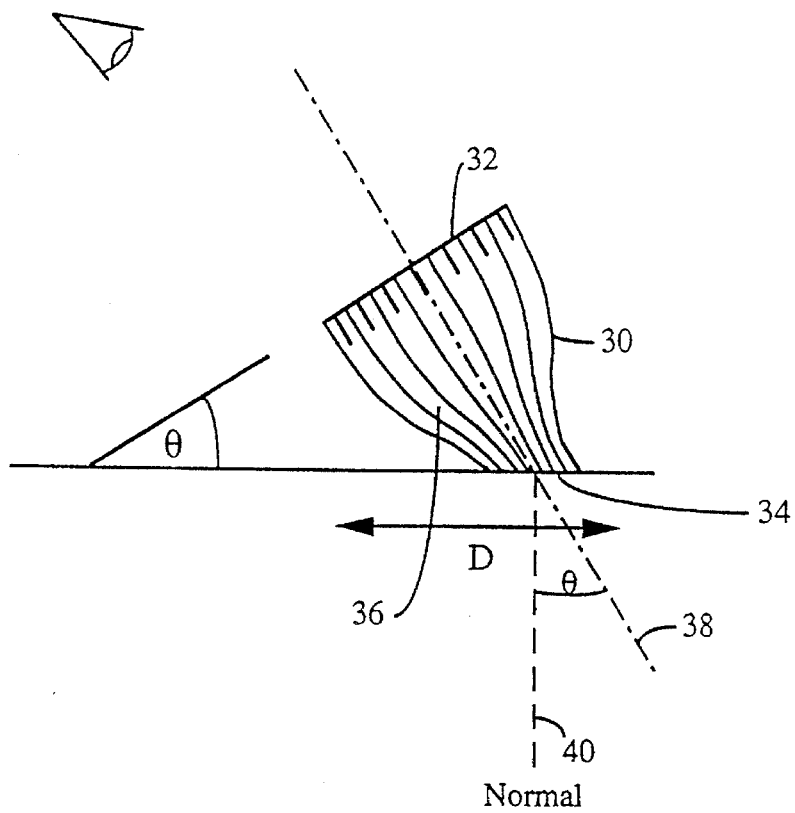
FIG. 3 is a side view of one embodiment of a reading magnifier of the present invention.
Figure 4:
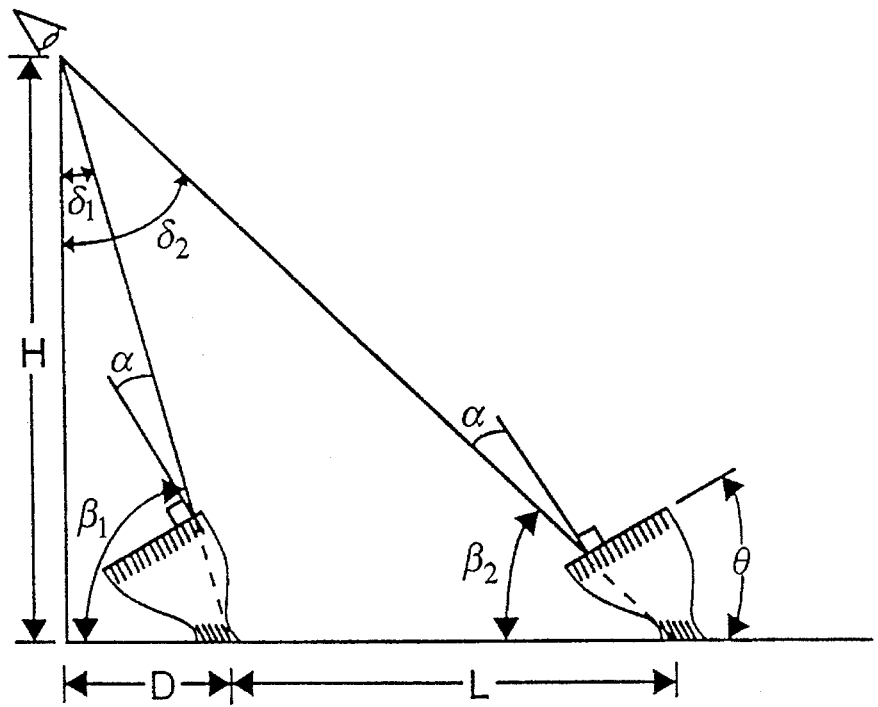
FIG. 4 is an illustration of the reading magnifier of FIG. 3 demonstrating the scanning range relative to a person sitting at a flat surface such as a desk.

One way in which the scanning area may be increased and made more comfortable for the viewer is by tilting the output face of the bundle of fibers taper toward the viewer. This can be done by cutting and surfacing the input or small face of the bundle at an angle to the axis as shown in FIG. 3. The reading magnifier 30 of FIG. 3 has a viewing face 32 that is perpendicular to the fused bundle of juxtaposed longitudinally tapered optical fibers. The fibers of the bundle are tightly juxtapositioned and coherently aligned. The flat base input end 34 of the solid bundle is cut on a bias angle across the bundle. The angle can be defined as an acute angle formed between a normal 40 to the flat base end 34 and an orientation direction 38 of the optical fibers. The orientation direction 38 is generally defined by a longitudinal axis through a straight centrally located fiber in the solid fiber bundle. The amount of the bias angle along with the effective N.A. of the bundle will determine the scanning range of the magnifier (FIG. 4). This range may be calculated as follows:

$$\tan \delta_1 = \frac{D}{H} \; ; \tan \delta_2 = \frac{(D+L)}{H}$$

$$\beta_1 = 90° - \theta + \alpha; \beta_2 = 90° - \theta - \alpha$$

$$\delta_1 = 90° - \beta_1 = 90° - 90° + \theta - \alpha = \theta - \alpha$$

$$\delta_2 = 90° - \beta_2 = 90° - 90° + \theta + \alpha = \theta + \alpha$$

$$\tan \delta_1 = \tan(\theta - \alpha) = \frac{D}{H}$$

-continued $$\tan\delta_2 = \tan(\theta + \alpha) = \frac{(D+L)}{H}$$

$$D + L = H\tan(\theta + \alpha)$$

$$D = H\tan(\theta - \alpha)$$

$$\therefore L = H[\tan(\theta + \alpha) - \tan(\theta - \alpha)]$$

where $\sin\alpha = N.A._{EFF}$, $\theta$ = tilt angle of taper and $N.A._{EFF} = \frac{N.A.\text{(nominal)}}{M}$ Example: Let $\theta = 25°$, $N.A. = 1.0$, $M = 3$, $H = 10$ inches,
$\therefore N.A._{EFF} = .33$, $\sin\alpha = .33$, $\alpha = 19.47°$ $$L = 10[\tan(25 + 19.5) - \tan(25 - 19.5)] = 8.85 \text{ inches}$$

$$D = H \cdot \tan(\theta - \alpha) = 1 \text{ inch}$$

For the nominal case where D=O, the taper magnifier is scanned from just under the eyes and away from the observer. For this case the optimal tilt angle is $\theta=\alpha$. Smaller angles will result in a loss of scanning range (expressed as negative D values in Table 1). The effective (useful) range is the range L minus any negative portion of the measure D. Angles of tilt larger than $\alpha$ are possible but will force the scanning range away from the user (D>O). A small positive value for D such as 1–2 inches is probably best for the reading task. Table 1 compares the calculated scanning field for a number of tapers parameters, and illustrate the increases in the effective scanning range resulted from the introduction of a tilt.

TABLE 1

The effective scanning field calculated for a number of tapers. In all cases height of eye is object is H = 10".

| NA (nominal) | Mag (M) | α = admittance | θ = Tilt | L | D | Effective Range |
|---|---|---|---|---|---|---|
| 1.0 | 3.0X | 19.47° | 0° | 7.07" | −3.54" | 3.54" |
| 1.0 | 3.0X | 19.47° | 19.47° | 8.08 | 0" | 8.08" |
| 1.0 | 3.0X | 19.47° | 25° | 8.85" | 0.97" | 8.85" |
| 1.0 | 2.5X | 23.58° | 0° | 8.73" | −4.36" | 4.36" |
| 1.0 | 2.5X | 23.58° | 30° | 12.43" | 1.13" | 12.43" |
| 0.66 | 2.5X | 15.31° | 0° | 5.47" | −2.74" | 2.74" |
| 0.66 | 2.5X | 15.31° | 20° | 6.26" | .82" | 6.26" |
| 1.0 | 2.0X | 30° | 0° | 11.55" | −5.77" | 5.77" |
| 1.0 | 2.0X | 30° | 36° | 21.41" | 1.05" | 21.41" |

The lateral scanning range is also limited by the effective range. By slightly rotating the slanted taper (towards the user) while scanning laterally, the lateral range can be maximized. The full scanning field covered this way will be bound by a circle of radius equal to the scanning range (L+D), center at the observer. Thus for D=O, for most of the forward field (up to 85%) a lateral field wider than the scanning range (L) may be covered.

Cutting the smaller face of the bundle at an angle (FIG. 3) will introduce a small amount of an anamorphic magnification into the image displayed on the large face. That is, the magnification will be different for the vertical and horizontal meridians (diameters) of the transmitted image. The amount of this difference (more correctly the ratio of these magnifications) is simply the cosine of the angle of cut relative to the normally (perpendicular) face (FIG. 3) (angle θ). For a relatively large angle of cut of θ=30° in the above examples, cos 30°=0.87, so that only 13% anamorphic magnification results. For a more typical value of θ=20° (cos 20°=0.94), the ratio is 0.94 which is scarcely noticeable. This anamorphic magnification causes the vertical magnification of the scanned text to be slightly less than the horizontal so that enlarged objects appear slightly wider (or less high) than normal when viewed with the tilted bundle 30. Even this small difference can be reduced or eliminated in a number of ways as shown below.

If the cut through the small end of the magnifier is made through the tapered portion of the magnifier an additional type of distortion will result, namely "Keystone" distortion. When cut through the tapered portion, different regions of the upper taper face provide different magnifications. The region closer to the user provides less magnification than the region further away from the user. The level of distortion depends both on the angle of cut and on the steepness of the tapering at the level of the cut. This distortion is not particularly serious, however, because when the magnifier is used for reading, each line of text has a uniform magnification and the difference between the magnification of adjacent lines is small and unimportant.

Figure 5A:
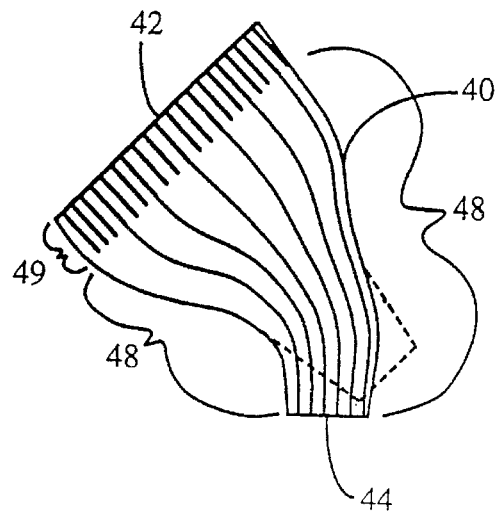
FIG. 5a is a side view of an alternate embodiment of the reading magnifier of the invention.

One method for eliminating all anamorphic magnification or keystone like distortion is to "bend" the smaller end of the bundle as shown in FIG. 5a. The reading magnifier 40 of FIG. 5a is a solid bundle of tightly juxtapositioned longitudinally tapered optical fibers. The flat base end 44 of the bundle is perpendicular to the longitudinal orientation of the optical fibers at the intersection with the flat base. The bundle has a tapered portion 48 in which the optical fibers increase in diameter from the base end 44 towards the wide end of the bundle. The tapered portion 48 is bent or curved near the flat base end 44. The fibers in the tapered portion 48 are continuous fibers that have been bent or curved. A viewing face 42 may be cut across the tapered portion 48 perpendicular to the orientation direction of the optical fibers. Alternatively, a constant diameter portion of the optical fibers 49 may be provided between the tapered portion 48 and viewing face 42.

Figure 5B:
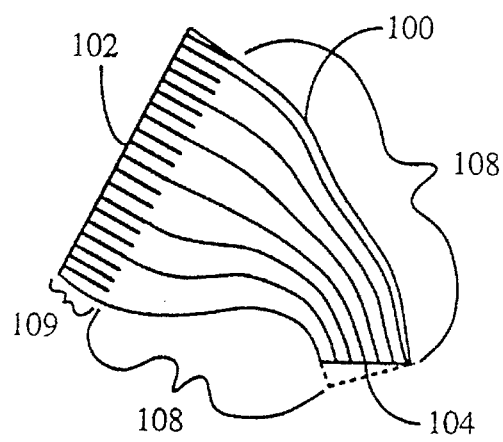
FIG. 5b is a side view of a second alternate embodiment of the reading magnifier of the invention.

A combination of both bending and bias cutting may be employed to tilt the magnifier toward the user. The desired tilt can be achieved partially from a smaller angle bend and partially from a smaller angle bias cut as illustrated in FIG. 5b. Such a magnifier 100 has a tapered portion 108 and may optionally include a constant diameter portion 109 adjacent the viewing face 102. The tapered portion 108 has a partial bend near the small base end 104. The base end 104 is cut at a bias angle relative to the orientation direction of the optical fibers in the bundle adjacent to the base end. The bias cut shortens the fibers at the inner radii of the bend in the bundle. The bias cut therefore adds to the tilt of the magnifier begun by the bend. By combining a bend and a bias cut, a more stable magnifier than one achieved only through bending can be achieved. The smaller angle of bending may result in easier production and reduced distortions. Similarly, the partial bend reduces the needed angle for the bias cut resulting in a reduction in distortions associated with such a cut.

Figure 6A:
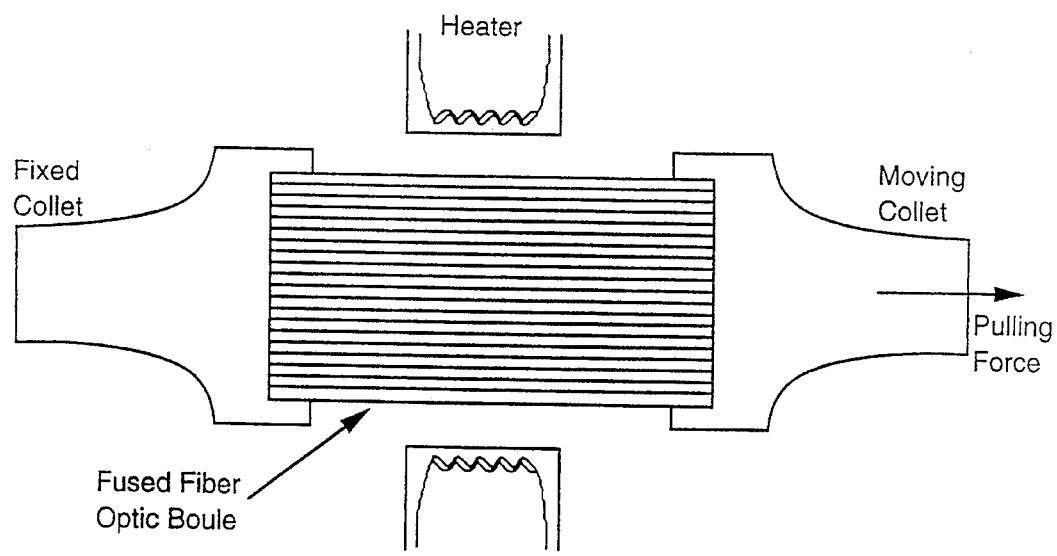
FIG. 6a and 6b illustrate one method for making the tapered magnifiers of the invention.
Figure 6B:
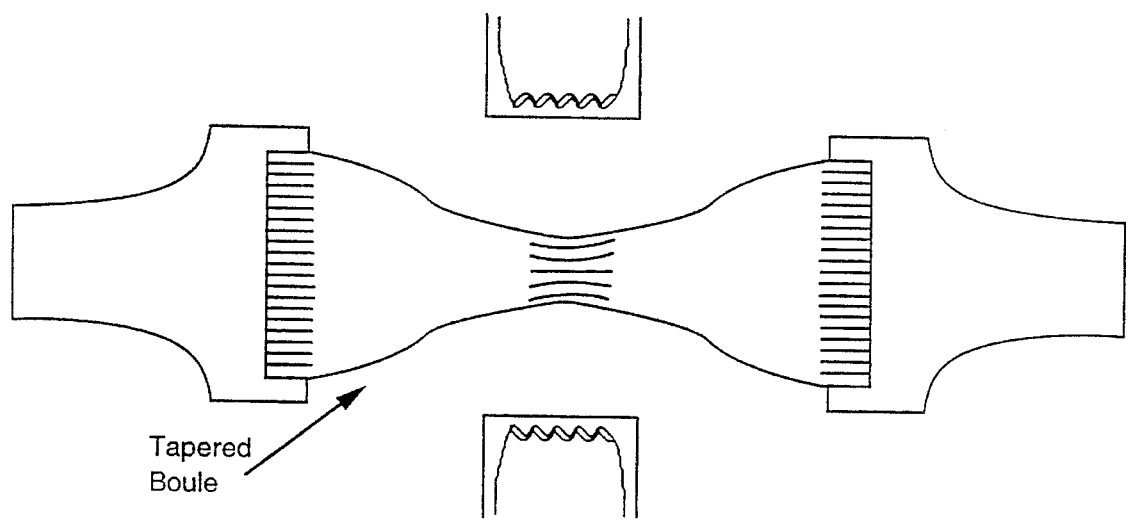
Figure 7:
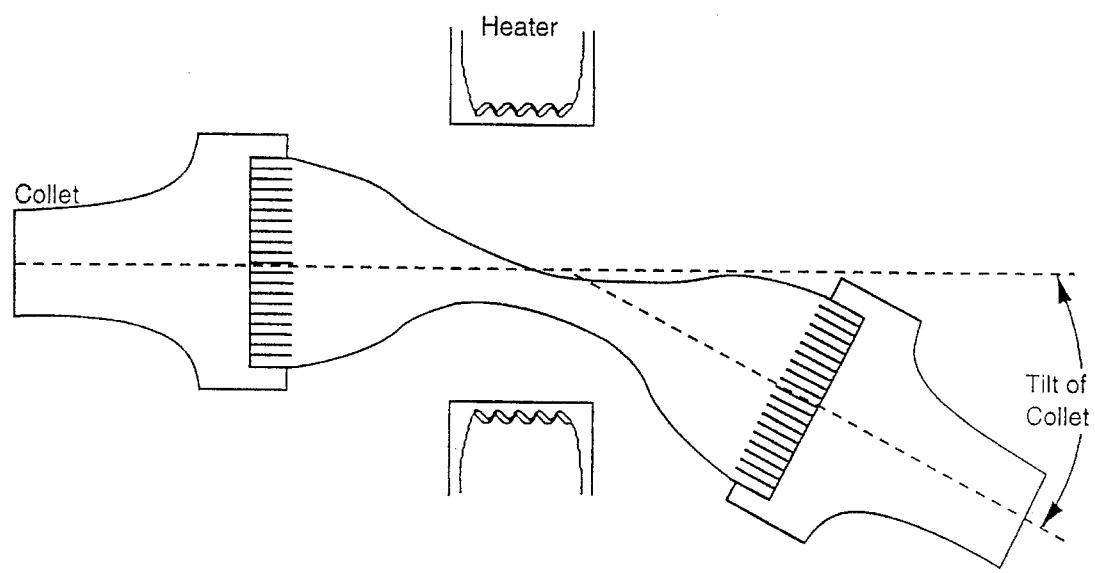
FIG. 7 is an illustration of a method step for making the reading magnifier of the alternate embodiment illustrated in FIG. 5.

Tapering and bending of a fused bundle of optical fibers can be achieved in either a single or a combination of forming steps by softening the fiber bundle at an appropriate temperature in an electric furnace as shown in FIG. 6a. The usual tapering process is done by heating the central region of a cylindrical bundle or boule of fused optical fibers and pulling the heat softened boule into an hourglass shape as shown in FIG. 6b. Bending of the dual taper can then be achieved by tilting one end relative to the other as shown in FIG. 7 either as part of the same heating cycle or as a separate operation. In either case, if the operation is carried out with symmetrical forces and heat distribution, two essentially identical tapers can be made from the starting boule. The curved bundle is cooled to a solid inflexible state. The bundle may then be cut across the central region forming two magnifiers. In use, the bend in the reading magnifier 40 will tilt the magnifier towards the user to provide the increased scanning range and will not suffer from the distortions of a bias angle cut through the bottom, smaller end.

Figure 8:
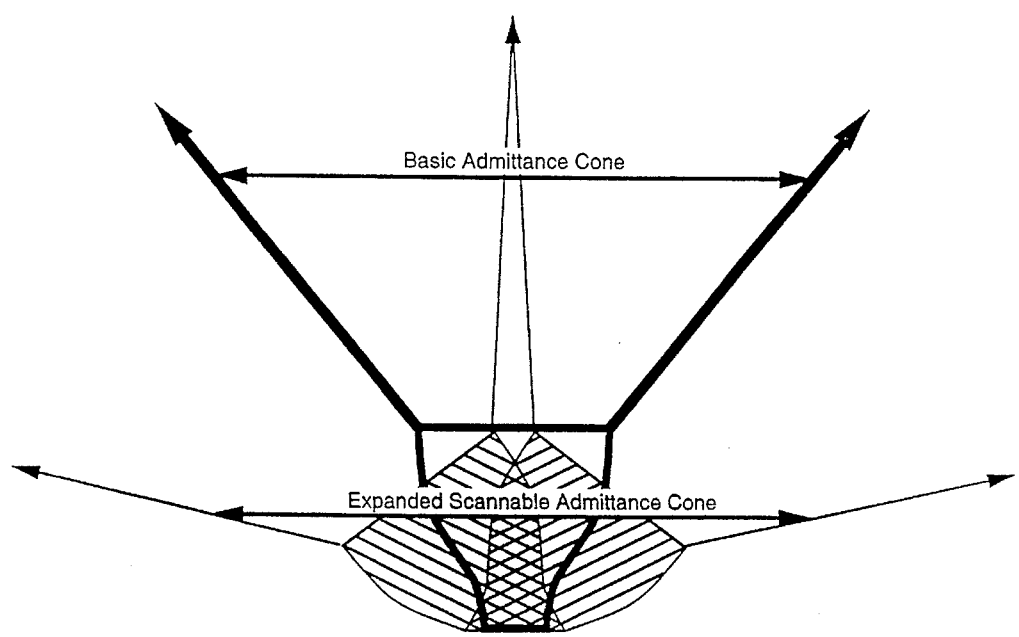
FIG. 8 is a diagram illustrating the concept of the expanded admittance cone.

In addition to providing an increased scanning range these tilted fiber optic magnifiers, of both types described above, also provide better control of illumination, both for the purpose of collecting the ambient light and in avoiding the glare resulting from specular reflections of any bright light sources from the upper viewing face of the bundle. Due to the tilt of the upper face, rotation of the magnifier around a vertical axis permits the user to include within the magnifier's admittance cone a light source (a window or a ceiling light fixture) which would otherwise be outside the admittance cone of the same taper without the tilt (FIG. 8). A prior art bundle of tapered optical fibers 20 with perpendicular top and bottom faces has a cone of admittance which is symmetrical about a center axis. Rotation of the prior art bundle 20 does not alter the location of the cone of admittance. Once a light source lies within the admittance cone its light is concentrated by the tapered fibers and results in a brighter image. Specular reflections from bright sources which would be reflected from the polished upper surface of the magnifier can also be redirected with the magnifiers of the invention by the same slight rotation of the magnifier to tilt the reflections off the viewing face away from the user's eyes.

Figure 9:
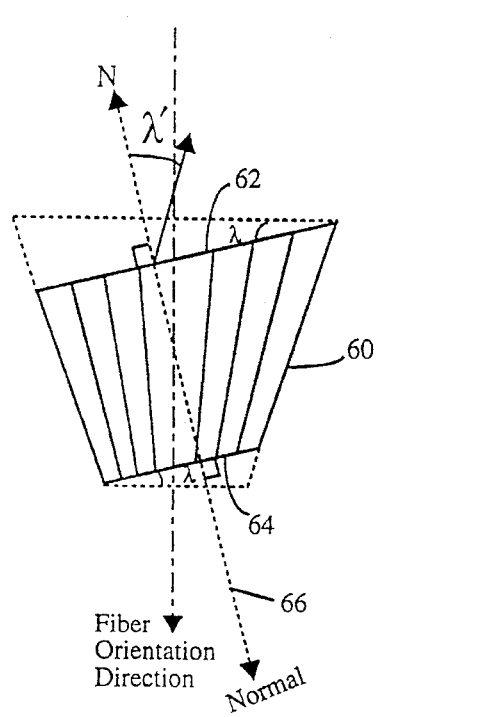
FIG. 9 is a side view of another embodiment of the present invention in which the viewing end and flat base end of the reading magnifier are parallel to one another.

A second method for reducing or eliminating the anamorphic and keystone like distortion of the taper bias cut at the smaller end involves a second substantially parallel cut of the taper at the large viewing end 62 as shown in FIG. 9. In accordance with this alternate embodiment, a bundle of tightly juxtapositioned longitudinally tapered optical fibers 60 is cut at a bias angle across its small end to form a flat base end 64. Substantially the same bias angle is used to cut across the optical fibers at the larger end to form the viewing face 62. A line normal 66 to the flat base end 64 makes the acute bias angle with a line in the orientation direction of the optical fibers in the bundle 60. The orientation direction of the fibers is generally defined by a straight optical fiber located in the center of the bundle 60.

The main purposes of the bias cut to form the viewing face 62 are to direct the viewing face of the bundle so as to provide a more convenient and comfortable viewing position for the viewer, and to distribute the output light to achieve a maximum scanning range over the object (such as a printed page), and to provide better control over collecting light from sources in the user's environment. Effectively, the fibers' tips are cut at an angle forming prisms. At the same time the bias cut of the top face also may be used to reduce or eliminate the anamorphic magnification.

The relation of the angle of cut at the large end to the angle of cut at the smaller end needed to correct for the anamorphic and keystone distortions can be calculated for simple cases and easily approximated for other conditions. For the case of a bundle of ideal conical shape (where both cuts are made through the conical portion) they should be parallel to eliminate both types of distortions (FIG. 9). In any case, the angle of the cut at the large end should be similar to the angle of cut at the small end relative to perpendicular to orientation direction of the fibers. If not equal, it is preferred that the amount of the angle of the cut of the large end be smaller than the cut at the small end, so that the magnifier view face is tilted towards the user.

Figure 10:
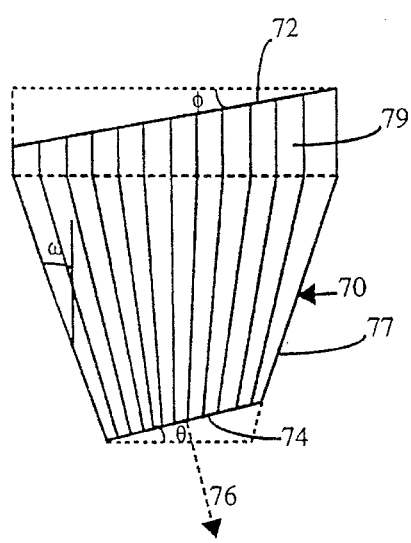
FIG. 10 is a side view of a still further embodiment of the invention wherein the bundle of optical fibers has a constant diameter portion adjacent the viewing end.

For a bundle 70 with a conical tapered portion 77, where the top of the bundle is blended into a cylindrical untapered constant portion diameter (FIG. 10) the effect is different. If the bias cut at the large viewing end 72 is made above the tapered portion 77 the keystone distortion will not be affected by this cut at any angle. On the other hand, the anamorphic magnification can be eliminated by this cut at an angle $\phi$ where $$\cos\phi = \frac{\cos(\omega + \theta)}{\cos^2\omega}$$

where $\omega$ is the angle of the conical taper (angle between the outer wall of the tapered portion 77 and the orientation direction of the fibers) and $\theta$ is the bias angle of the cut at the small base end 74 of the bundle.

Figure 11:
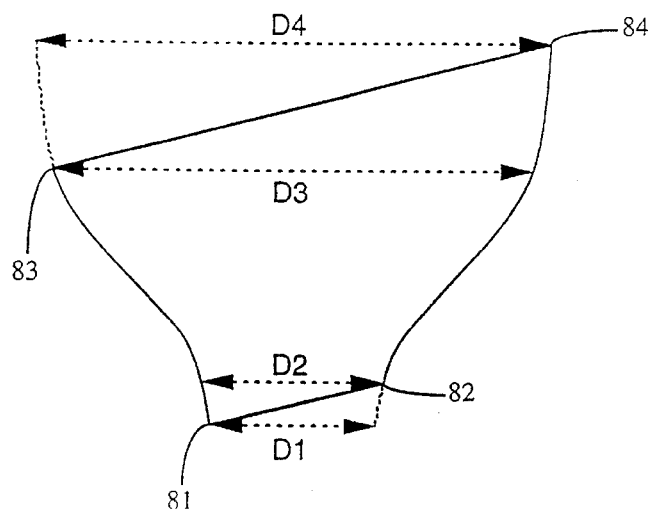
FIG. 11 is a diagram illustrating the ideal tilt angles cut through a bundle of tapered optical fibers for limiting distortions.

Most practical fiberoptic tapers are not exactly conical in shape. Complete elimination or major reduction of the keystone distortion can be achieved with any shape of taper by bias cutting the top surface of the magnifier through the tapered portion at such an angle that the change in taper diameter across the cut will be at the same ratio as the change of the taper diameter across the bottom cut. As shown in FIG. 11, once the bottom face was cut at a given angle, defining the two diameters $D_1$ and $D_2$, the top face has to be cut down to a level on the taper defined by taper diameter $D_3$ such that Another way to state the desired relationship is that the cut $$\frac{D_1}{D_2} = \frac{D_3}{D_4}$$

should be such that local magnification or the ratio of fiber diameters at the corresponding edges will be equal, i.e., the fiber diameter at 84 will be the same ratio to diameter at 82 as is diameter at 83 to 81.

The bias cut of the top face also results in directing the light emerging from the bundle towards the user ( as explained below) and thus reduces the magnitude of the angle of the bias cut needed at the smaller end. The smaller the angle of cut at the small end the less the magnitude of distortions resulting therefrom.

The bias cut at the large viewing end 62 is used to direct the light toward the user. This is due to the prismatic effect at the tip of each fiber i.e. the light emerging from the center of each fiber passes (refracted) at an angle through a glass air interface. With the angle cut, the light emerging at the center of each fiber passes through a glass air interface at an angle. This refraction tends to cause emerging rays to deviate towards the user as shown by angle $\lambda'$ in FIG. 9. The optimal deviation or tilt of the axial ray from the vertical is slightly more than the admittance half angle $\alpha$ determined by the NA. With this level of tilt the same condition of slightly positive range D described above will be achieved. The tilt of the axial ray due to the bias cut of the top face is close to twice the cut angle. For a fiber core glass with index n=1.8, a cut of the viewing face at angle λ' will result in the axial ray in the air shifted at angle to the normal where $$\sin \lambda' = 1.8 \sin \lambda$$

Therefore, a combined parallel cut of both surfaces of the taper at angle λ will result in an axial ray tilt of about 2λ from the vertical. The fibers will arrive at the top at an angle of λ and the top face cut will shift the ray about 2λ from the normal which is now vertical again. Thus, optimal tilt can be achieved by cutting both the bottom and top faces at angles $$\lambda \approx \frac{\alpha}{2}$$

This smaller angle of cut reduces the level of anamorphic magnification effect and the keystone type distortion to a negligible level.

Figure 12:
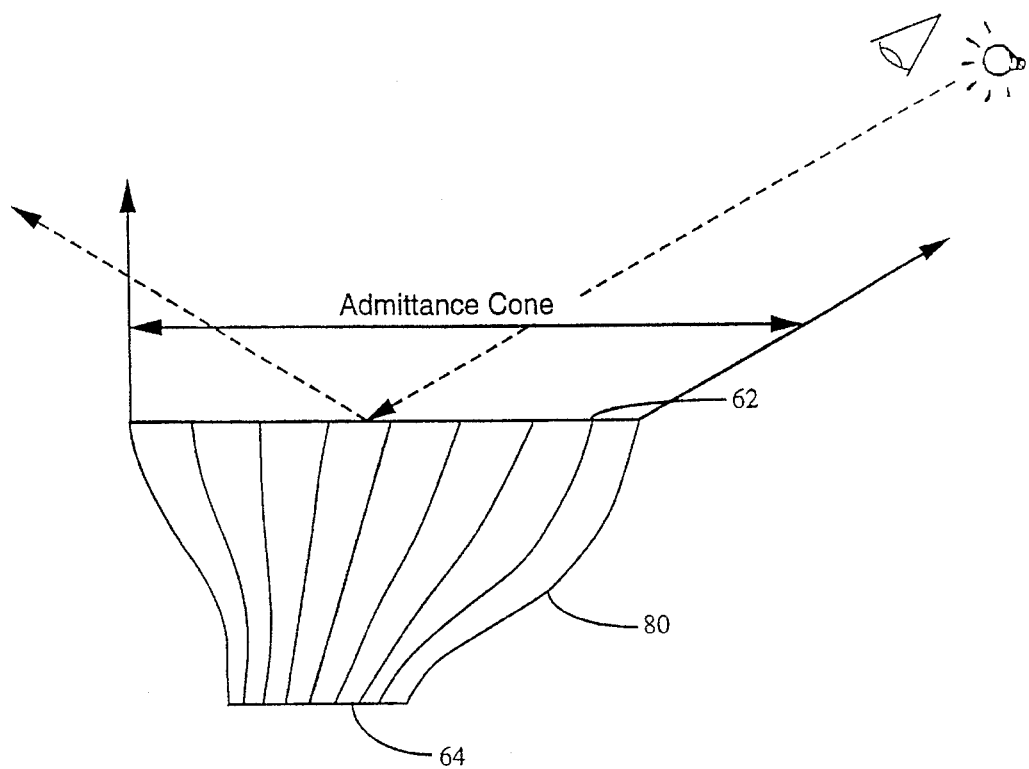
FIG. 12 is an illustration of the admittance cone and the control of specular reflections associated with a reading magnifier cut in accordance with FIG. 11.

In addition to reducing distortion and therefore also preserving magnification, the cut at the top of the taper combined with the nearly parallel cut at the bottom permits better control of the light collection and specular reflections. The cone of light admittance is skewed at an angle relative to vertical as shown in FIG. 12 for a practical tapered bundle 80. With this design the bundle can be used effectively with illumination coming over the user's shoulder onto the paper. This illumination arrangement is recommended for visually impaired and for comfortable reading in general to prevent glare from the source from reaching the user's eyes. A bundle 80 cut as described above will have a flat top viewing surface 62 parallel to the desk, therefore, specular reflections from light sources behind the user will be reflected away from the user's eyes.

Although the top surface of the taper is horizontal its admittance cone is tilted relative to vertical. Vertical being established by a normal to the flat base end 64. (FIG. 12). Thus the position of the admittance cone in space can be controlled by slight rotations of the bundle, as is possible with the tilted viewing end of the above-described embodiments, to scan the environment for better collection of light from ambient sources.

Figure 13A:
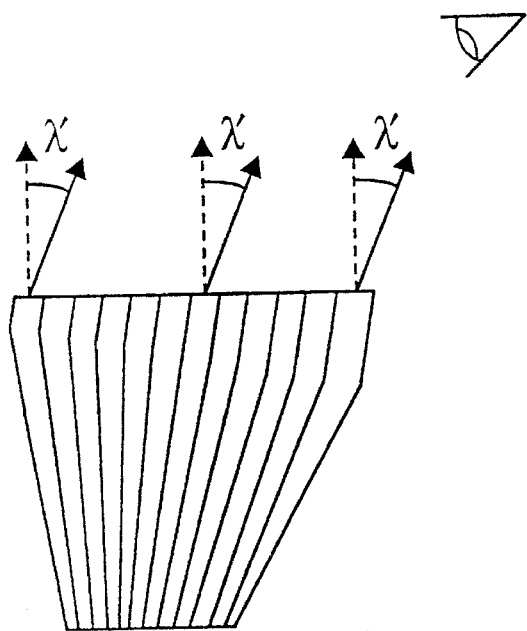
FIG. 13a is a diagram illustrating the chief ray tilted towards the user at the large face of a magnifier illustrated in FIG. 10.
Figure 13B:
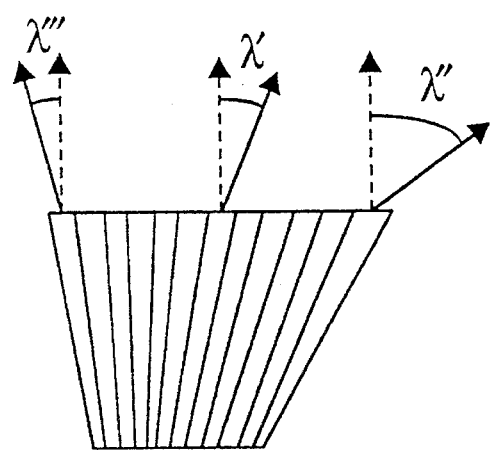
FIG. 13b is a diagram illustrating the change in chief ray light tilt at the viewing face of a magnifier that has been cut across a tapered portion of a bundle of optical fibers.

If the cut through the top surface is made through the tapered portion, the amount of light tilt will vary across the viewing face as illustrated in FIG. 13b. The light emerging from the region of the viewing face for positioning closer to the user will be tilted more towards the user than light emerging from the center of the viewing face.

$$\lambda'' > \lambda'$$

This is the result of the combined overall taper tilt and the inherent tilt of fibers on the outside portion of the bundle. On the other hand, at the region of the viewing face to be positioned further from the user, the light will be bent the least since the prismatic effect due to the taper tilt will cancel the inherent fiber tilt. It may actually be bent away from the user but the angle of deviation from the normal is smaller there.

$$\lambda > \lambda'''$$

Figure 14:
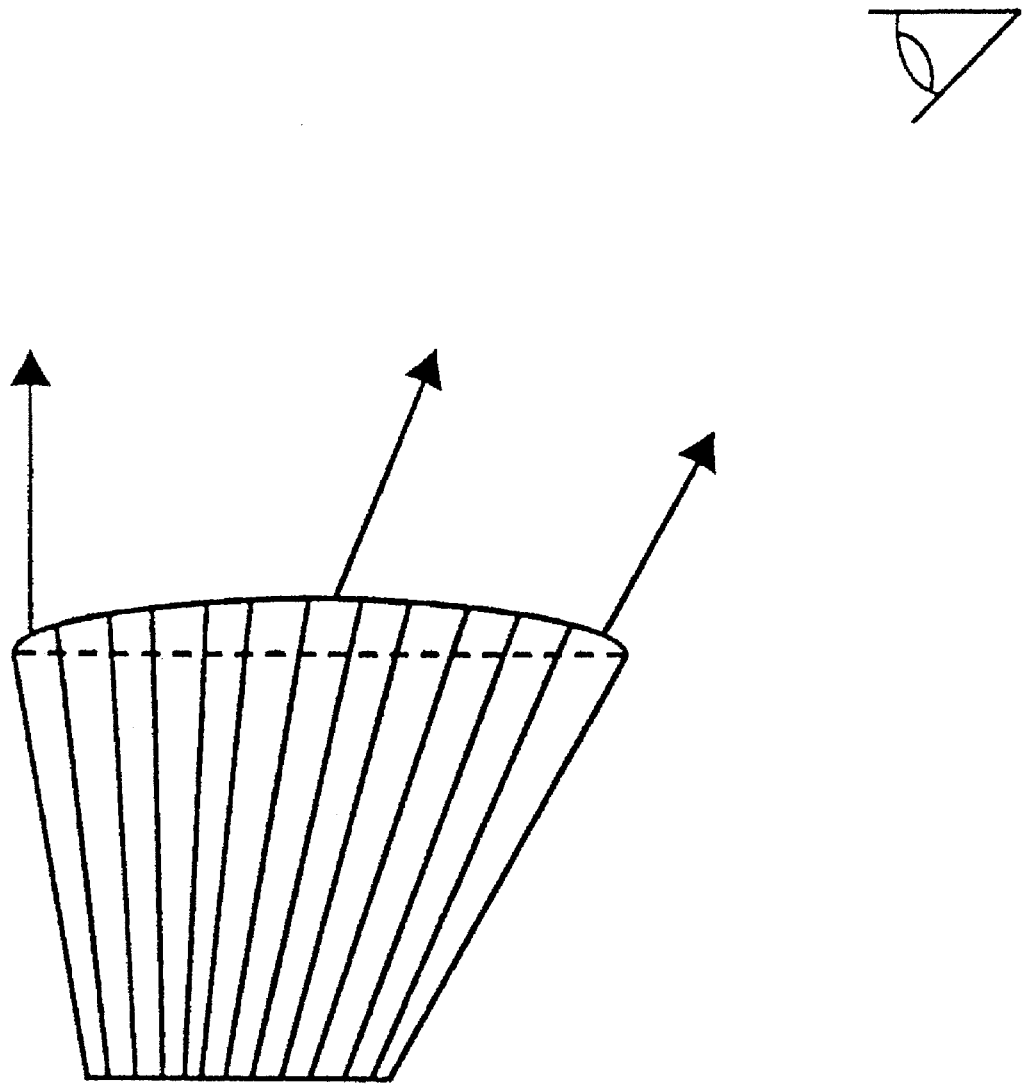
FIG. 14 is a side view of a still further embodiment of the invention in which the viewing face is a convex surface.

Thus the deviation at that region of the viewing face away from the observer will be reduced as is preferred. The tilt of the light across the viewing face may be favorably controlled even further by forming the top surface as a convex surface 92 of either spherical shape or of cylindrical shape with horizontal axis perpendicular to the front to back direction of the slant cut across the top of the bundle 90, as shown in FIG. 14. With such a convex surface the amount of local prismatic effect at both the near and far regions of the top face may be reduced to counter the change in fiber angles at the edges of the taper.

Of course, it should be understood that various changes and modifications to the preferred embodiments described above will be apparent to those skilled in the art. For example, the bias angle selected for cutting the flat base end and viewing end may differ as well as the differences in the degree of taper of the optical fibers. Also, the shape of the reading magnifier may be changed to suit the desirability of the final product for handling by the user of the magnifier. These and other changes can be made without departing from the spirit and scope of the invention and without diminishing its attendant advantages. It is therefore intended that such changes and modifications be covered by the following claims.

I claim:

1. A reading magnifier comprising:
   a bundle of juxtaposed longitudinally tapered optical fibers having a large end and a flat small end, said optical fibers each having a larger diameter at the large end than proximate the flat small end, said bundle of optical fibers being coherently aligned along an orientation direction defined by a longitudinal axis through a straight centrally located optical fiber in said bundle, wherein a line normal to the flat small end forms an acute angle with the orientation direction.

2. The reading magnifier of claim 1 wherein each of said tapered optical fibers has a diameter at the large end of at least about 80 microns.

3. The reading magnifier of claim 1 wherein the large end of said bundle is substantially parallel with the flat small end of said bundle.

4. The reading magnifier of claim 1 wherein the large end of said bundle has a convex spherical surface.

5. The reading magnifier of claim 1 wherein the large end of said bundle has a cylindrical surface.

6. The reading magnifier of claim 1 wherein said bundle of tapered optical fibers has a constant diameter portion extending between the large end and a tapered portion of said fibers.

7. The reading magnifier of claim 1 wherein said bundle of tapered optical fibers is characterized by a cone of light admittance through the large end that is skewed at an angle relative to a direction normal to the flat small end.

\* \* \* \* \*